(12) United States Patent
Ishibashi

(10) Patent No.: US 11,108,928 B2
(45) Date of Patent: Aug. 31, 2021

(54) INTERRUPTION HANDLING IN AN IMAGE FORMING DEVICE

(71) Applicant: FUJI BUSINESS INNOVATION CORP., Tokyo (JP)

(72) Inventor: Tomohiro Ishibashi, Kanagawa (JP)

(73) Assignee: FUJIFILM Business Innovation Corp., Tokyo (JP)

(\*) Notice: Subject to any disclaimer, the term of this patent is extended or adjusted under 35 U.S.C. 154(b) by 0 days.

(21) Appl. No.: 16/808,481

(22) Filed: Mar. 4, 2020

(65) Prior Publication Data
US 2021/0029264 A1    Jan. 28, 2021

(30) Foreign Application Priority Data

Jul. 26, 2019  (JP) .............................. JP2019-138138

(51) Int. Cl.
*G06F 3/12* (2006.01)
*H04N 1/00* (2006.01)

(52) U.S. Cl.
CPC ....... *H04N 1/00915* (2013.01); *G06F 3/1211* (2013.01); *G06F 3/1243* (2013.01); *G06F 3/1274* (2013.01)

(58) Field of Classification Search
None
See application file for complete search history.

(56) References Cited

U.S. PATENT DOCUMENTS

2007/0019224 A1\*  1/2007  Okada ................... H04N 1/2353
                                                               358/1.13
2013/0100493 A1\*  4/2013  Otsuka .................. G06F 3/1288
                                                               358/1.15
2015/0234333 A1\*  8/2015  Yasuda .............. G03G 15/5016
                                                               399/75
2017/0052745 A1\*  2/2017  Kanematsu ........ H04N 1/00915
2017/0255848 A1\*  9/2017  Fujita ..................... G06F 3/1259
2018/0203651 A1\*  7/2018  Fukushima ............. G01S 7/006
2018/0255186 A1\*  9/2018  Takeo ................... G06F 3/1273
2018/0376025 A1\* 12/2018  Iida .................... H04N 1/00652
2019/0138252 A1\*  5/2019  Okada ..................... G06F 3/121

FOREIGN PATENT DOCUMENTS

JP        2004195784 A   \*  4/2004
JP        2004-195784 A       7/2004
JP        2004195784 A   \*  7/2004
JP        2008159021 A   \*  7/2008
JP        2008159021 A   \*  8/2008

\* cited by examiner

*Primary Examiner* — Henok Shiferaw
(74) *Attorney, Agent, or Firm* — Oliff PLC

(57) ABSTRACT

An information processing device includes a processor configured to issue an instruction to an image forming device. The processor is configured to: in a case where an interruption instruction is received, issue an instruction for a processing mode of the image forming device to be transitioned from a normal mode in which jobs are executed in an order in which the jobs are received, to an interruption mode in which a job that is being executed is suspended and an interruption job is executed first; and, after completion of the interruption job, issue an instruction for the processing mode to be transitioned from the interruption mode to the normal mode, in accordance with a cancellation method in which the interruption mode is canceled, predicted from information representing a state of the image forming device.

10 Claims, 14 Drawing Sheets

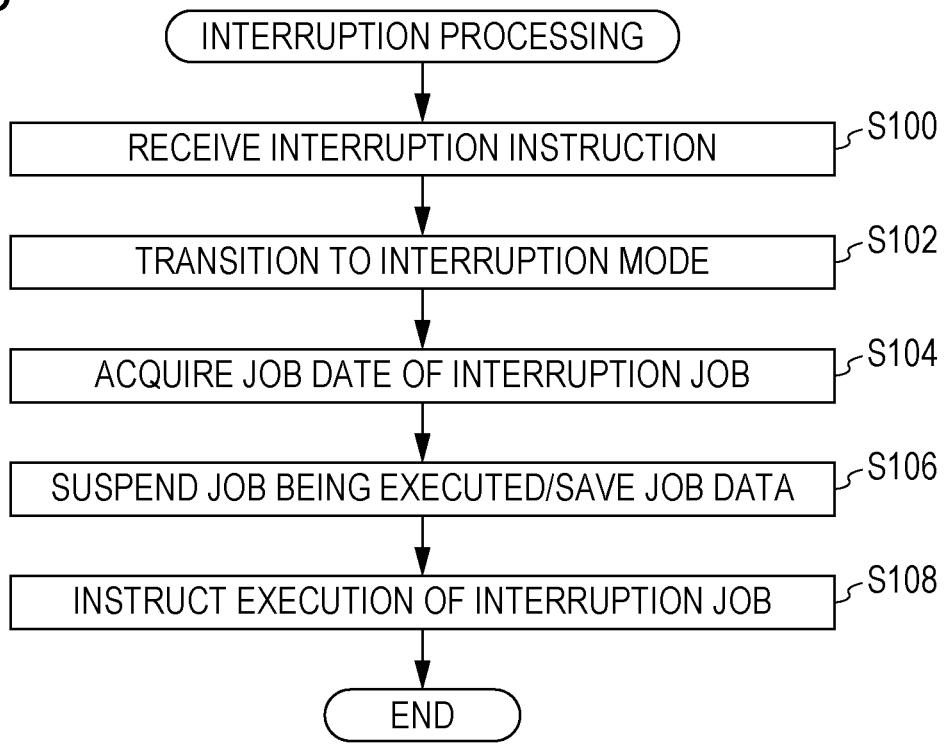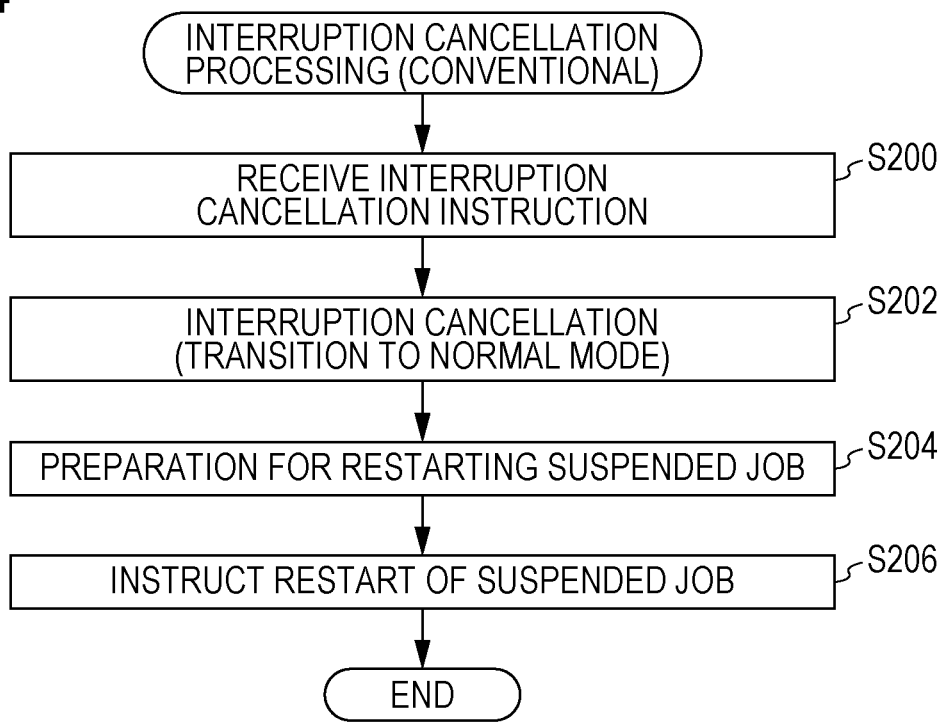

FIG. 7

| EXECUTION ORDER | JOB ID | USER ID | JOB TYPE | MODE | JOB STATE |
|---|---|---|---|---|---|
| 1 | ABC | X | PRINT | NORMAL | EXECUTING |
| 2 | BCD | Y | PRINT | NORMAL | WAITING EXECUTION |
| 3 | CDE | Z | PRINT (ACCUMULATED) | NORMAL | WAITING EXECUTION |

FIG. 8

| EXECUTION ORDER | JOB ID | USER ID | JOB TYPE | MODE | JOB STATE |
|---|---|---|---|---|---|
| 1 | DEF | Z | COPY | INTERRUPTION | EXECUTING |
| 2 | ABC | X | PRINT | NORMAL | SUSPENDED |
| 3 | BCD | Y | PRINT | NORMAL | WAITING EXECUTION |
| 4 | CDE | Z | PRINT (ACCUMULATED) | NORMAL | WAITING EXECUTION |

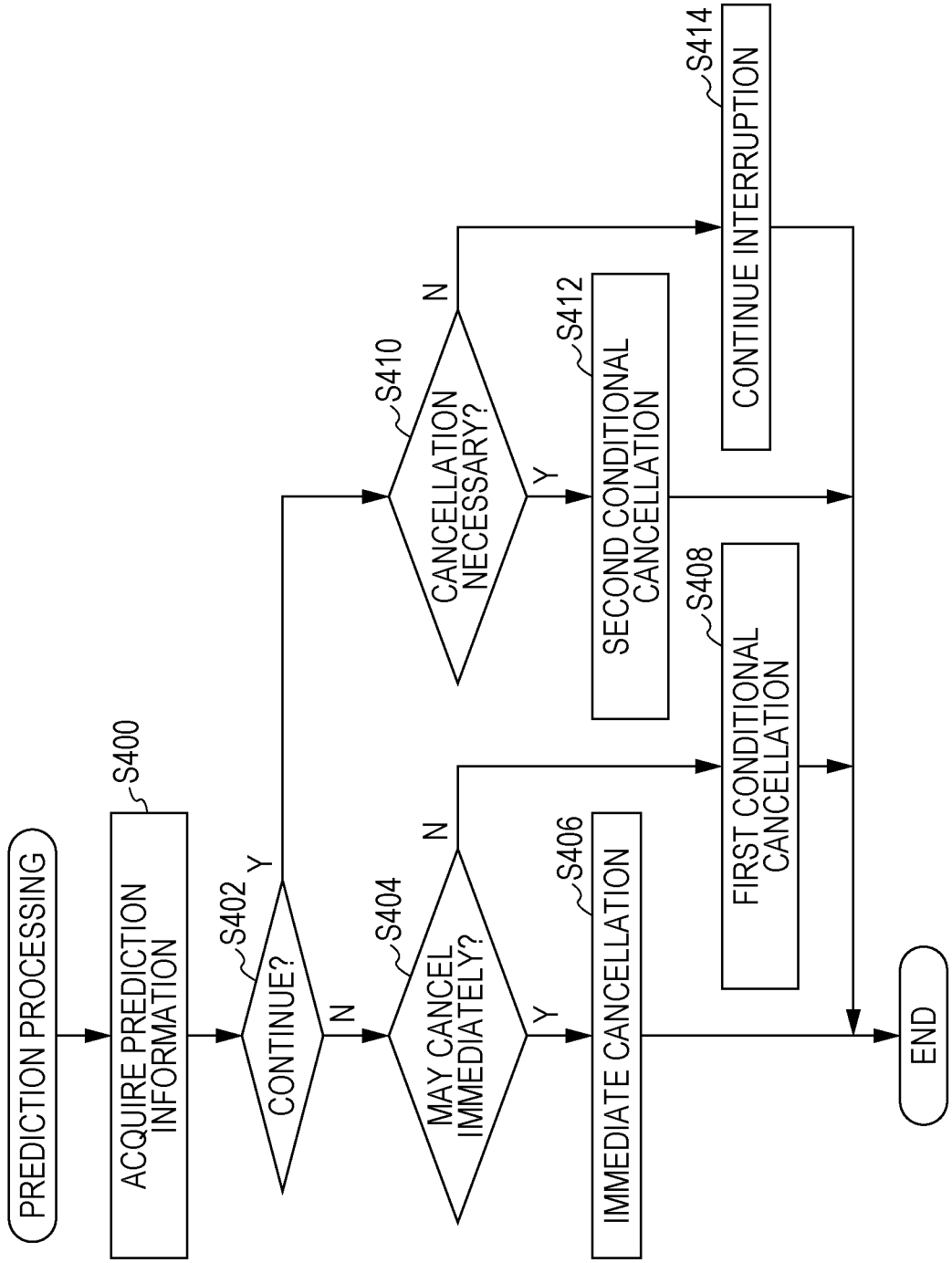

FIG. 12

| | INTERNAL STATE INFORMATION (E.G. JOB MANAGEMENT INFORMATION) | EXTERNAL STATE INFORMATION | |
|---|---|---|---|
| | | DOCUMENT DETECTION INFORMATION | PERSON DETECTION INFORMATION |
| CONTINUATION CAUSE | - THERE ARE OTHER JOBS OF THE INTERRUPTION USER<br>- THERE ARE OTHER JOBS RECENTLY REGISTERED BY THE INTERRUPTION USER | - THERE IS A DOCUMENT ON THE PLATEN GLASS<br>- THERE IS A DOCUMENT ON THE AUTOMATIC DOCUMENT FEEDER<br>- THERE IS A DOCUMENT ON THE PLATEN GLASS/AUTOMATIC DOCUMENT FEEDER | - THERE IS A PERSON IN THE IMAGING REGION<br>- THERE IS A PERSON NEAR THE OPERATION PANEL |
| CANCELLATION CAUSE | - THERE ARE NO OTHER JOBS OF THE INTERRUPTION USER<br>- ANOTHER JOB OF A GENERAL USER HAS BEEN RECEIVED AFTER TRANSITIONING TO THE INTERRUPTION MODE | - THERE IS NO DOCUMENT ON THE PLATEN GLASS/AUTOMATIC DOCUMENT FEEDER | - THERE IS NO PERSON IN THE IMAGING REGION<br>- THERE IS A PERSON NEAR THE OUTPUT UNIT |
| WAITING USER INFORMATION | - THERE IS A JOB WAITING TO BE OUTPUT<br>- A NEW JOB HAS BEEN RECEIVED<br>- THE OPERATION RATE IS HIGH | | - THERE ARE 2 OR MORE PERSONS IN THE IMAGING REGION |

FIG. 15

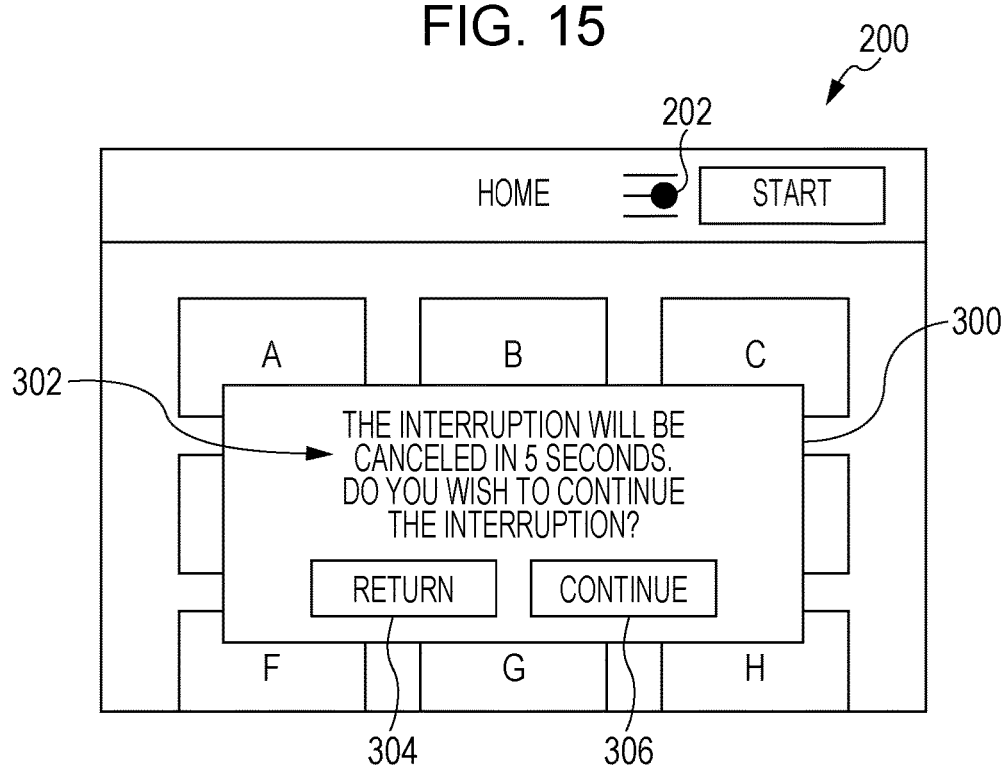

FIG. 16

| | OPERATION HISTORY INFORMATION |
|---|---|
| CONTINUATION CAUSE | - TENDENCY FOR JOBS TO BE ACCUMULATED AND OUTPUT ALL AT ONCE ON THE DAY IN QUESTION (ACCUMULATION PRINTING/BATCH OUTPUT) |
| CANCELLATION CAUSE | - TENDENCY FOR JOBS TO BE OUTPUT IMMEDIATELY ONCE ACCUMULATED (DIRECT PRINTING)<br>- TENDENCY FOR A LONG TIME TO ELAPSE WITHOUT AN OPERATION BEING PERFORMED DURING AN INTERRUPTION (CANCELLATION FORGOTTEN) |

FIG. 17

| | PRE-INTERRUPTION INTERNAL STATE INFORMATION |
|---|---|
| WAITING USER INFORMATION | - THE CASE WHERE AN INTERRUPTION OCCURS DURING OUTPUT<br>- THE CASE WHERE AN INTERRUPTION OCCURS DURING LOG-IN |

INTERRUPTION HANDLING IN AN IMAGE FORMING DEVICE

CROSS-REFERENCE TO RELATED APPLICATIONS

This application is based on and claims priority under 35 USC 119 from Japanese Patent Application No. 2019-138138 filed Jul. 26, 2019.

BACKGROUND

(i) Technical Field

The present disclosure relates to an information processing device and a non-transitory computer readable medium.

(ii) Related Art

Japanese Unexamined Patent Application Publication No. 2004-195784 discloses an image forming device provided with: an image forming unit that forms an image on a recording medium; an interruption unit that, when the image is being formed by the image forming unit, causes a transition to an interruption mode in which separate image forming processing is prioritized and carried out; an interruption automatic canceling unit that automatically cancels the interruption mode; and a switching unit that switches between an on/off setting for whether or not automatic canceling of the interrupt mode is carried out by the interruption automatic canceling unit.

SUMMARY

There are image forming devices that are provided with an interruption function. An interruption function is a function that suspends a job that is being executed and preferentially executes another job. A user requests the image forming device to carry out processing such as printing or copying, for example. A "job" represents processing that is requested such as a print job or a copy job, for example.

For example, in an environment in which multiple users are jointly using an image forming device, an interruption function is used in a case where, during the execution of a job of a user, another user wishes to have a separate job prioritized and executed. Hereinafter, a user who uses the interruption function will be referred to as an "interruption user", and users other than the interruption user will be referred to as "general users". Furthermore, a job that is executed using the interruption function will be referred to as an "interruption job". The state (the processing mode, in other words) of a device that receives a job being a state in which it is possible for an interruption job to be received will be referred to as an "interruption mode".

An image forming device including an interruption function is provided with a button that instructs an interruption (hereinafter, referred to as an "interruption button"). A user instructs an interruption by pressing the interruption button. When an interruption is instructed, the image forming device causes the processing mode to transition from a normal mode to the interruption mode. It should be noted that the normal mode is a processing mode that is not the interruption mode. In the normal mode, jobs are executed in the order in which they are received.

The image forming device maintains the processing mode in the interruption mode until the interruption mode is canceled. The user instructs an interruption cancellation by once again pressing the interruption button during an interruption, for example. When an interruption cancellation is instructed, the image forming device causes the processing mode to be restored to the normal mode from the interruption mode.

Aspects of non-limiting embodiments of the present disclosure relate to providing an information processing device and a non-transitory computer readable medium with which time and effort may be saved in a user operation to cancel an interruption mode.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing device including a processor configured to issue an instruction to an image forming device. The processor is configured to: in a case where an interruption instruction is received, issue an instruction for the processing mode of the image forming device to be transitioned from a normal mode in which jobs are executed in the order in which the jobs are received, to an interruption mode in which a job that is being executed is suspended and an interruption job is executed first; and, after completion of the interruption job, issue an instruction for the processing mode to be transitioned from the interruption mode to the normal mode, in accordance with a cancellation method in which the interruption mode is canceled, predicted from information representing the state of the image forming device.

BRIEF DESCRIPTION OF THE DRAWINGS

Exemplary embodiments of the present disclosure will be described in detail based on the following figures, wherein:

FIG. 3 is a flowchart depicting an example of the flow of "interruption processing";

FIG. 4 is a flowchart depicting an example of the flow of conventional "interruption cancellation processing";

FIG. 7 is a chart depicting an example of a job management table;

FIG. 8 is a chart depicting an example of the job management table after an interruption;

FIG. 11 is a flowchart depicting an example of the flow of "prediction processing";

FIG. 12 is a chart depicting an example of prediction information serving as determination material in a first exemplary embodiment;

FIG. 15 is a schematic view depicting an example of a confirmation screen;

FIG. 16 is a chart depicting an example of prediction information serving as determination material in a second exemplary embodiment;

FIG. 17 is a chart depicting an example of prediction information serving as determination material in a third exemplary embodiment.

DETAILED DESCRIPTION

Hereinafter, examples of exemplary embodiments of the present disclosure will be described in detail with reference to the drawings.

<Configuration of Image Forming Device>

First, an image forming device will be described.

Figure 1:
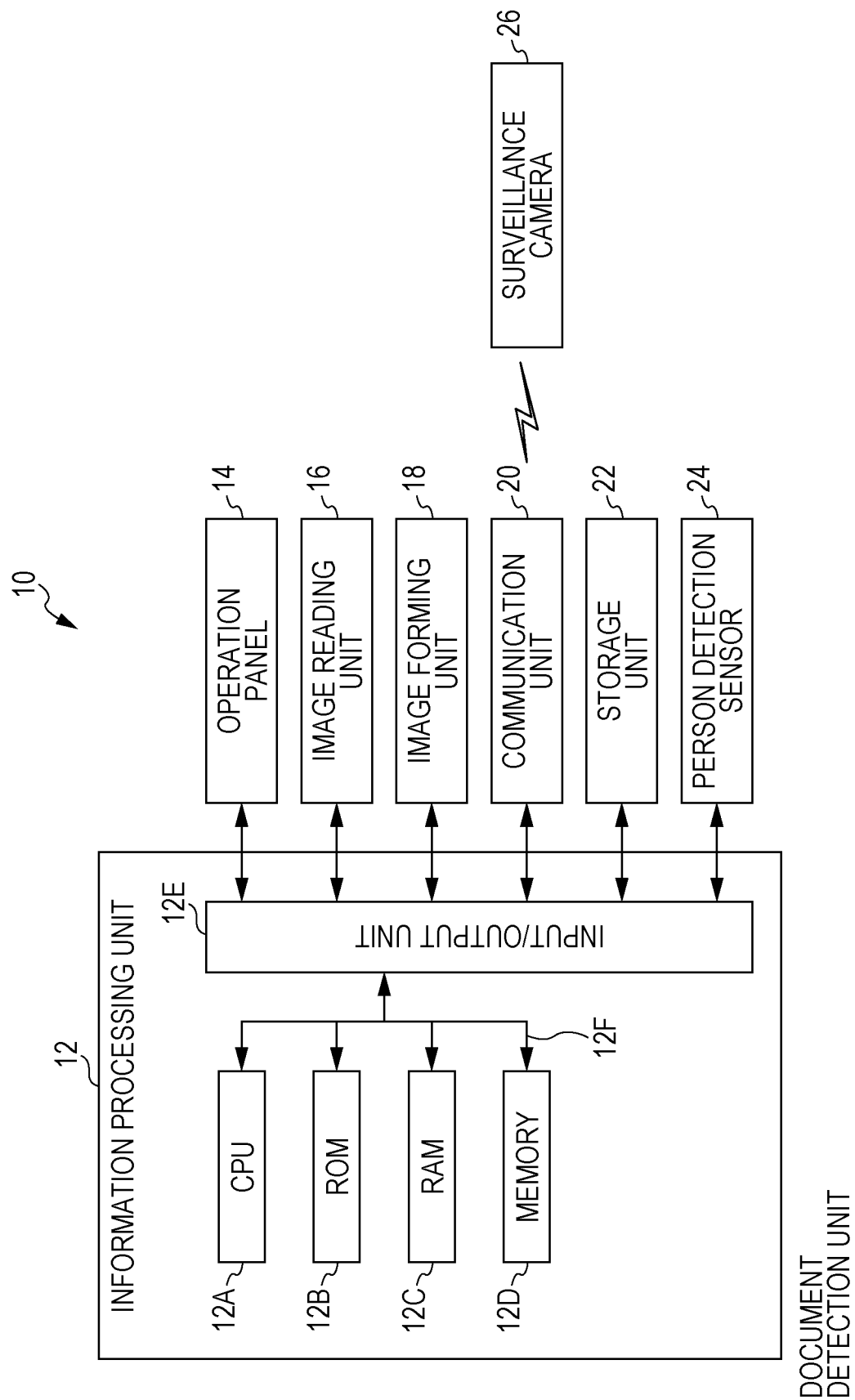
FIG. 1 is a block diagram depicting an example of the configuration of an image forming device.

FIG. 1 is a block diagram depicting an example of the configuration of the image forming device. As depicted in FIG. 1, an image forming device 10 is provided with an information processing unit 12 which is a computer that carries out control of the entire device and various types of calculations. The information processing unit 12 is provided with a CPU 12A, a ROM 12B in which various types of programs are stored, a RAM 12C which is used as a work area when a program is executed, a nonvolatile memory 12D, and an input/output unit 12E. The CPU 12A, the ROM 12B, the RAM 12C, the memory 12D, and the input/output unit 12E are connected via a bus 12F.

Furthermore, the image forming device 10 is provided with an operation panel 14, an image reading unit 16, an image forming unit 18, a communication unit 20, a storage unit 22, and a person detection sensor 24. The operation panel 14, the image reading unit 16, the image forming unit 18, the communication unit 20, and the storage unit 22 are connected to the input/output unit 12E. The information processing unit 12 exchanges information with each unit and controls each unit. Furthermore, the person detection sensor 24 is also connected to the input/output unit 12E. The information processing unit 12 acquires information detected by the person detection sensor 24.

The operation panel 14 is a user interface for displaying various types of information to the user and receiving user operations. The operation panel 14 is provided with: a touch panel that displays various types of screens and receives input performed using touch operations on the screens; and mechanical operation buttons that are operated by being pressed, such as a home button or a power button or the like that returns the user to a home screen that is a standby screen.

The image reading unit 16 is a device that reads an image recorded on a document. In the present exemplary embodiment, the image reading unit 16 uses a CCD sensor optical element to optically read an image recorded on a document. The image reading unit 16 reads an image of a document placed on platen glass. The image reading unit 16 detects that there is a document on the platen glass by a change in the output of the CCD sensor.

In a case where the image reading unit 16 is provided with an automatic document feeder, a document that has been set in the automatic document feeder is conveyed to the platen glass. The automatic document feeder is provided with a document detection sensor. The document detection sensor detects that there is a document in the automatic document feeder.

The image forming unit 18 is a device that forms an image on a recording medium such as paper. The image forming system of the image forming unit 18 may be an electrophotographic system or may be an ink jet system. The communication unit 20 is an interface for communicating with external devices. The storage unit 22 is an external storage device such as a hard disk.

The person detection sensor 24 is a sensor that detects that a person is present within a predetermined distance (hereinafter, referred to as a detection range) from the image forming device 10. A possible example of the person detection sensor 24 is a pyroelectric infrared sensor that detects infrared rays emitted from a person. It should be noted that when it is detected that a person is present in the detection range of the person detection sensor 24, a "person detection unit 40", which is described later, acquires a video captured by an external surveillance camera 26 and detects the person who is present in the periphery of the image forming device 10 using image recognition.

The image forming device 10 provided with the aforementioned configuration is able to execute multiple types of processing such as: "scan processing" in which an image of a document is read and image data is generated; "copy processing" in which an image of a document is read and image data is generated, and an image is formed on a recording medium on the basis of the generated image data; "print processing" in which an image is formed on a recording medium on the basis of image data received from outside; and "fax processing" in which an image of a document is read and image data is generated, and the generated image data is transmitted outside.

It should be noted that, in the present exemplary embodiment, a control program for "interruption cancellation processing" described later is stored in the ROM 12B of the information processing unit 12. Furthermore, a "job management table" described later is stored in the memory 12D. It should be noted that various types of programs and various types of data may be stored in another storage device inside or outside the device, or may be stored on a recording medium such as a CD-ROM. Furthermore, various types of programs and various types of data may be acquired via telecommunication.

(Interruption Function)

Next, the interruption function will be described.

As described above, the interruption function is a function that suspends a job that is being executed and preferentially executes another job. In a case where an interruption user wishes to have a separate job prioritized and executed during the execution of a job of a general user, the job that is being executed is suspended and the interruption job is executed. Due to the interruption function, there is an increase in convenience for the interruption user but there is a decrease in convenience for the general user, whose own job enters a waiting state, for example.

Figure 2:
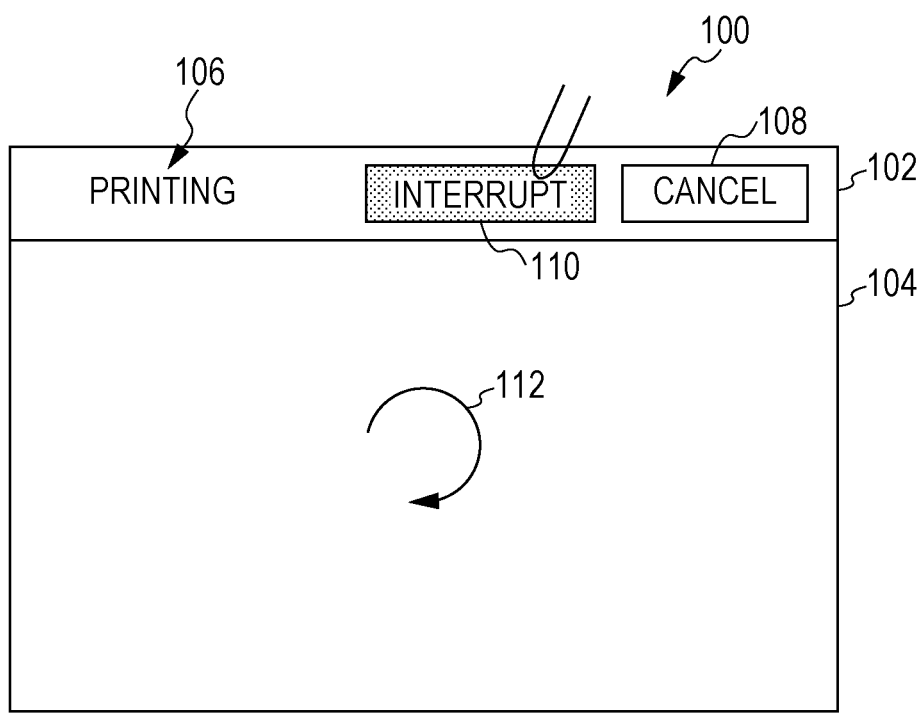
FIG. 2 is a schematic view depicting an example of a screen displaying an interruption button.

FIG. 2 is a schematic view depicting an example of a screen displaying an interruption button. As depicted in FIG. 2, during the execution of a job, an execution screen 100 indicating that a job is being executed is displayed on the operation panel. The execution screen 100 includes a header 102 and a main body 104. A message 106 such as "Printing." is displayed in the header 102. A moving image 112 or the like in which a semicircle rotates in the direction of the arrow is displayed in the main body 104.

An interruption button 110 that instructs an interruption is displayed in the header 102 of the execution screen 100, as well as a stop button 108 that stops a job. The interruption user instructs an interruption by pressing the interruption button 110 during the execution of a job by another user. When an interruption instruction is received, the processing mode transitions from the normal mode to the interruption mode. The interruption user then instructs an interruption job to be executed by selecting a job and then pressing a start button (not depicted), for example. Furthermore, the user instructs an interruption cancellation by once again pressing the interruption button 110 during the interruption. When an instruction to cancel an interruption is received, the processing mode transitions from the interruption mode to the normal mode.

—Interruption Processing—

Next, interruption processing will be briefly described.

FIG. 3 is a flowchart depicting an example of the flow of "interruption processing". Interruption processing is processing that is carried out by the information processing unit of the image forming device from an interruption being instructed to an interruption job being executed.

First, the information processing unit receives an interruption instruction (S100). Next, the information processing unit causes the processing mode to transition to the interruption mode in accordance with the interruption instruction (S102). Next, the information processing unit acquires job data of the interruption job (S104). Next, the information processing unit suspends the job that is being executed and saves the remaining job data thereof in the storage unit (S106). Next, the information processing unit instructs the image forming unit to execute the interruption job (S108).

It should be noted that job data is data that is required to execute a job, such as image data and setting information. For example, for a copy job, image data that is acquired by reading an image of a document and setting information such as the number of copies and the density for copy processing are acquired as job data.

—Conventional Interruption Cancellation Processing—

Next, conventional interruption cancellation processing will be briefly described.

FIG. 4 is a flowchart depicting an example of the flow of conventional "interruption cancellation processing". Conventional interruption cancellation processing is processing that is carried out by the information processing unit of the image forming device from an interruption cancellation being instructed to a suspended job being restarted.

First, the information processing unit receives an instruction to cancel an interruption (S200). Next, the information processing unit causes the processing mode to transition to the normal mode in accordance with the instruction to cancel the interruption (S202). Next, the information processing unit carries out preparation to restart the suspended job, such as reading the remaining job data from the storage unit and expanding the image data into bitmap data (S204). Next, the information processing unit instructs the suspended job to be restarted (S206).

<Overview of Operation of Information Processing Unit>

Next, the operation of each functional unit of the information processing unit will be described.

Figure 5:
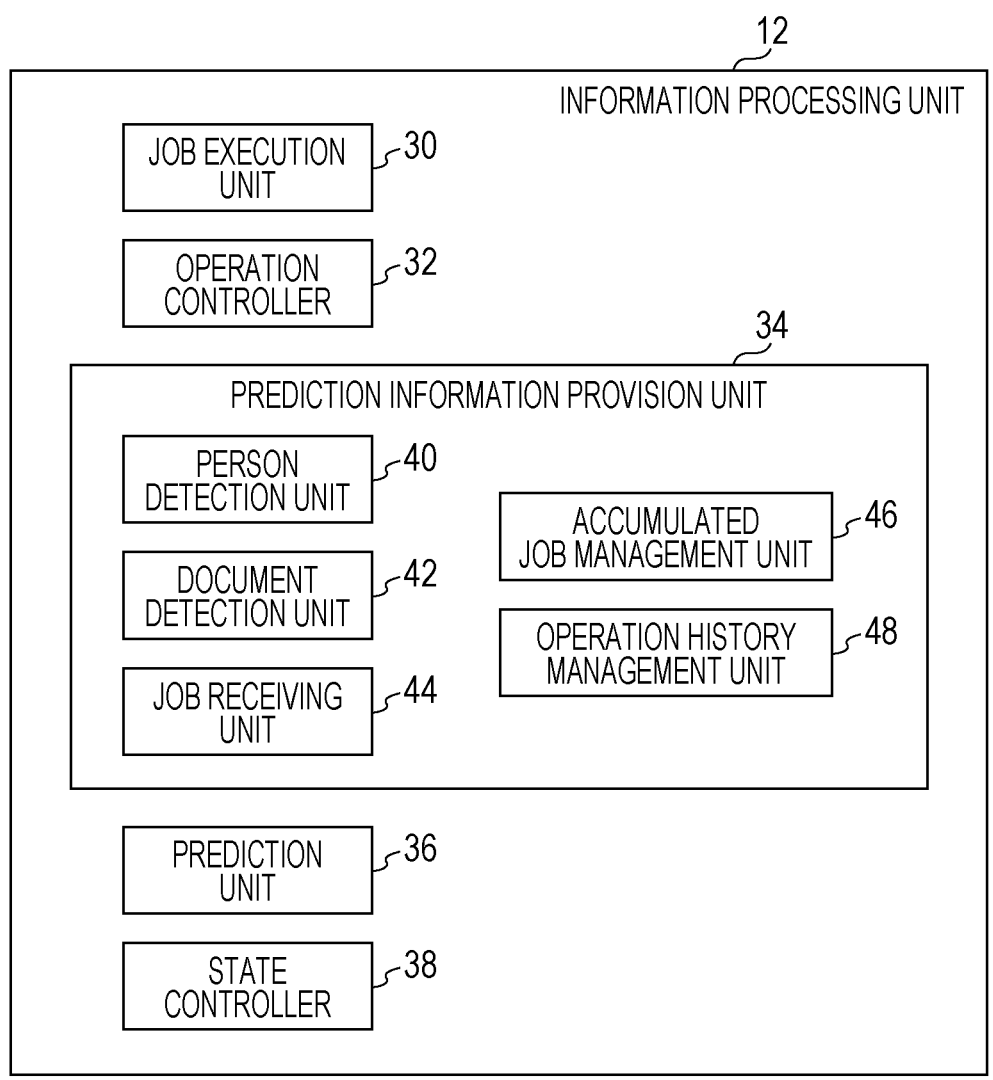
FIG. 5 is a functional block diagram depicting an example of the functional configuration of an information processing unit.

FIG. 5 is a functional block diagram depicting an example of the functional configuration of the information processing unit. Furthermore, FIG. 6 is a sequence diagram for describing an example of the operation of each functional unit of the information processing unit.

Figure 6:
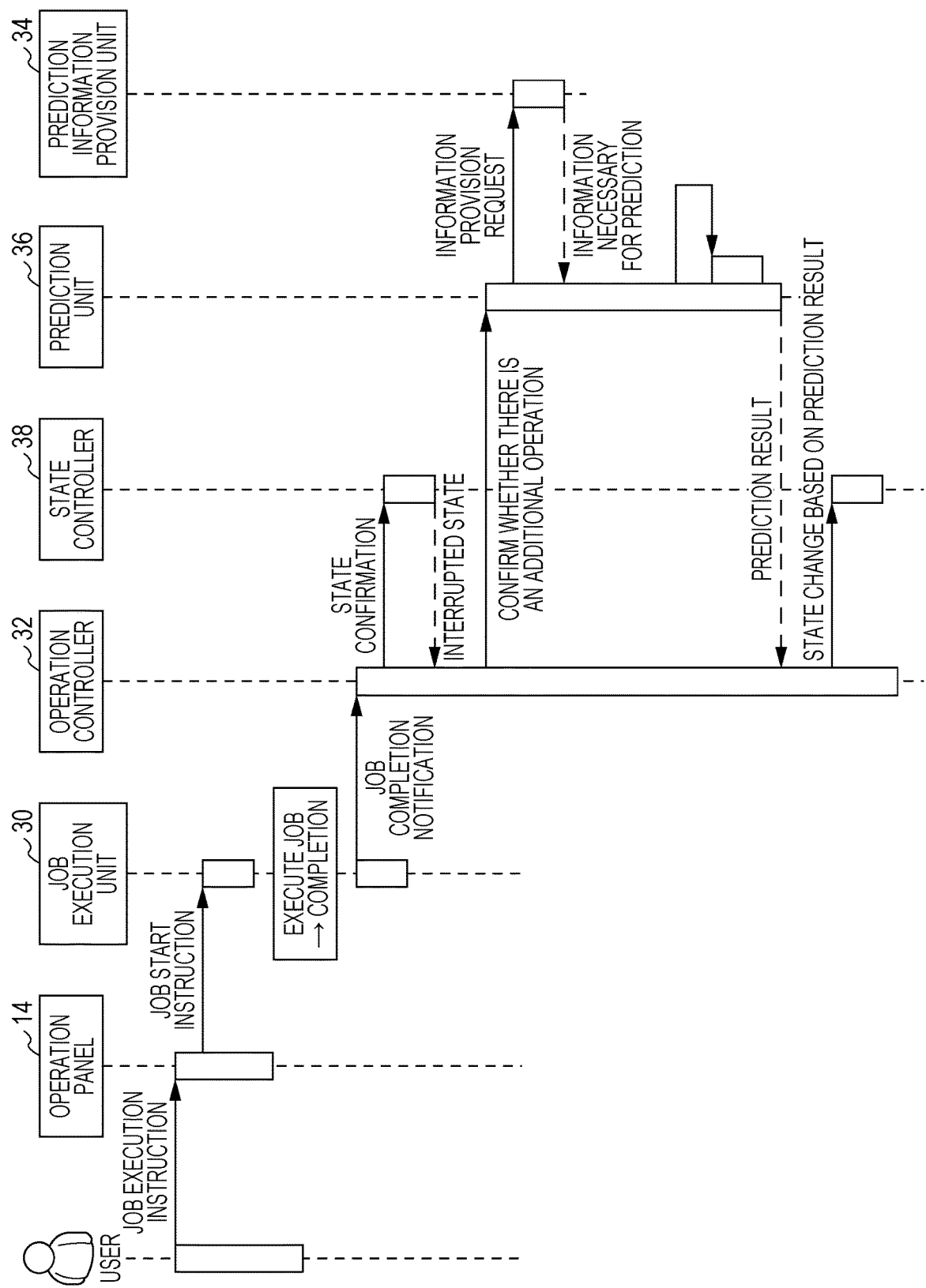
FIG. 6 is a sequence diagram for describing an example of the operation of each functional unit of the information processing unit.

As depicted in FIGS. 5 and 6, the information processing unit 12 is provided with a job execution unit 30, an operation controller 32, a prediction information provision unit 34, a prediction unit 36, and a state controller 38.

The job execution unit 30 instructs the execution of a job in accordance with a user operation. For example, for a print job, the image forming unit (see FIG. 1) is instructed to form an image on a recording medium on the basis of image data received from outside. When the job is completed, the operation controller 32 is notified of the completion of the job.

The prediction information provision unit 34 provides prediction information to the prediction unit 36. The prediction unit 36, on the basis of the provided prediction information, as described later, executes "prediction processing" in which a prediction is made as to whether the interruption mode is to be continued or the interruption mode is to be canceled, and which cancellation method is to be used in the case where the interruption mode is to be canceled.

The state controller 38 maintains or changes the processing mode in accordance with an instruction from the operation controller 32. In the present exemplary embodiment, the state controller 38 switches the processing mode between the normal mode and the interruption mode, and maintains the processing mode in the desired mode.

The operation controller 32, when notified of the completion of a job, confirms the processing mode maintained by the state controller 38. In a case where the processing mode is the interruption mode, the operation controller 32 requests the prediction unit 36 to execute prediction processing.

The operation controller 32 receives a prediction result from the prediction unit 36, and issues an instruction to the state controller 38 in accordance with the prediction result. In a case where the interruption mode is to be continued, no instructions are issued. In a case where the interruption mode is to be canceled, the state controller 38 is instructed to cause the processing mode to transition from the interruption mode to the normal mode.

Here, the configuration of the prediction information provision unit 34 will be described.

The prediction information provision unit 34 includes the person detection unit 40, a document detection unit 42, a job receiving unit 44, an accumulated job management unit 46, and an operation history management unit 48.

The person detection unit 40 detects whether a person is present in the periphery of the image forming device 10, and how many persons are present. In the present exemplary embodiment, when it is detected that a person is present in the detection range of the person detection sensor 24, the person detection unit 40 acquires a video captured by the surveillance camera, and detects the person who is present in the periphery of the image forming device 10 using image recognition. The person detection unit 40 performs detection with a distinction being made between a person who is near the operation panel and a person who is near the output unit, as described later. The person detection unit 40 provides the detection result to the prediction unit 36 as "person detection information".

The document detection unit 42 detects whether or not there is a document on the platen glass of the image reading unit, and whether or not there is a document that has been set in the automatic document feeder of the image reading unit. The document detection unit 42 provides the detection result to the prediction unit 36 as "document detection information".

The job receiving unit 44 receives a job from the operation panel or an external device. The accumulated job management unit 46 accumulates and manages the job data of received jobs. The job receiving unit 44 and the accumulated job management unit 46 provide management information, such as whether a new job has been received and whether there are other jobs, to the prediction unit 36 as "information representing the device internal state".

The operation history management unit 48 retains and manages a history of the operations carried out by the user. The operation history management unit 48 provides management information to the prediction unit 36 as "operation history information".

Here, the management of jobs will be described.

The accumulated job management unit 46 accumulates the job data of jobs received by the job receiving unit 44. The job data is accumulated for each user. For example, the job data of multiple print jobs is accumulated for a user who is using accumulation printing.

The accumulated job management unit 46 uses a job management table to manage jobs received by the job receiving unit 44. In the job management table, predetermined management information extracted from job data is stored in the form of a table in association with each other.

FIG. 7 is a chart depicting an example of a job management table. The management information includes a "job ID" that is an example of identification information that identifies a job, a "user ID" that is an example of identification information that identifies a user, a "job type" that represents a job type, a "mode" that represents the normal mode or the interruption mode, and a "job state" that represents a job execution state. Jobs are arranged in order of execution. The execution state of each job is managed using the job management table.

When a job is received by the job receiving unit 44, the job is registered in the job management table. When a job finishes, the finished job is deleted from the job management table. When a job is deleted, the execution rankings of the other jobs are each moved up by one.

FIG. 8 is a chart depicting an example of the job management table after an interruption. It is assumed that user Z has instructed the execution of a copy job (job ID: DEF) by pressing the interruption button during the execution of a print job (job ID: ABC) of user X. In this case, the state of the print job of user X is changed to "suspended", and the copy job of user Z constituting an interruption job is registered as a job having an execution ranking of 1.

(Person Detection Information)

FIGS. 13A to D are schematic views for describing a method for detecting a person from a surveillance camera video. In the depicted example, a surveillance camera is arranged above the image forming device 10. The surveillance camera captures a video of the image forming device 10 and the periphery thereof from above.

The image forming device 10 is provided with the operation panel 14 and the image forming unit 18 (see FIG. 1). The image forming unit 18 is provided with an output unit 18A that outputs a recording medium on which an image is formed, to outside of the device. The image forming device 10 is provided with a housing that is not depicted. The operation panel 14 is arranged in a location where the user is able to easily operate the operation panel 14, on an upper surface of the housing that is not depicted. The output unit 18A is provided on either the left or right-side surface of the housing that is not depicted (the right side in FIGS. 13A to D).

The person detection unit 40 acquires a video captured by the surveillance camera, and detects a person who is present "within a predetermined range" in the periphery of the image forming device 10 using image recognition. Furthermore, in the present exemplary embodiment, the person detection unit 40 performs detection with a distinction being made between a person who is near the operation panel 14 and a person who is near the output unit 18A.

Figure 13A:
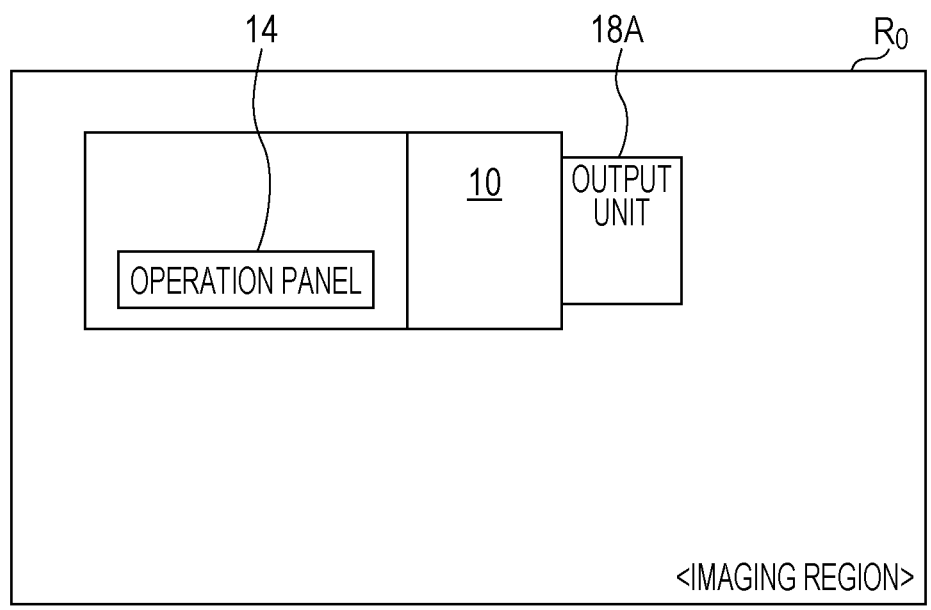
FIG. 13A to FIG. 13D are schematic views for describing a method for detecting a person from a surveillance camera video.
Figure 13B:
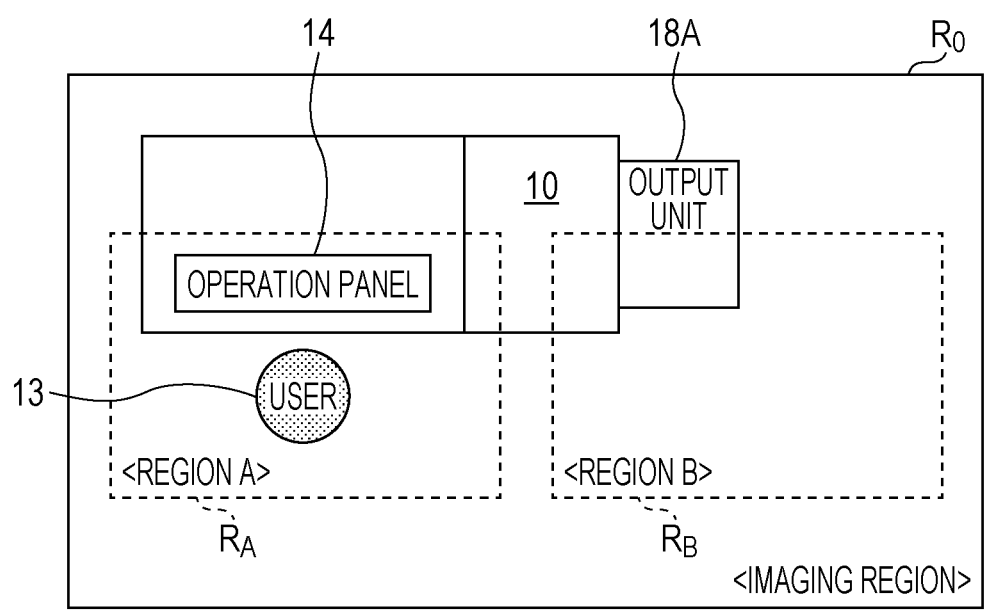
Figure 13C:
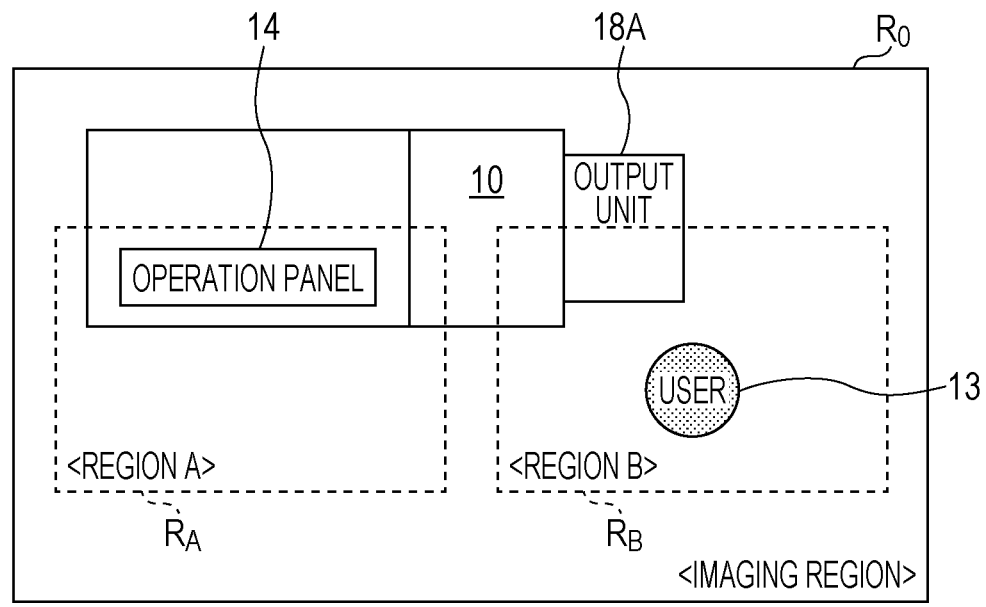
Figure 13D:
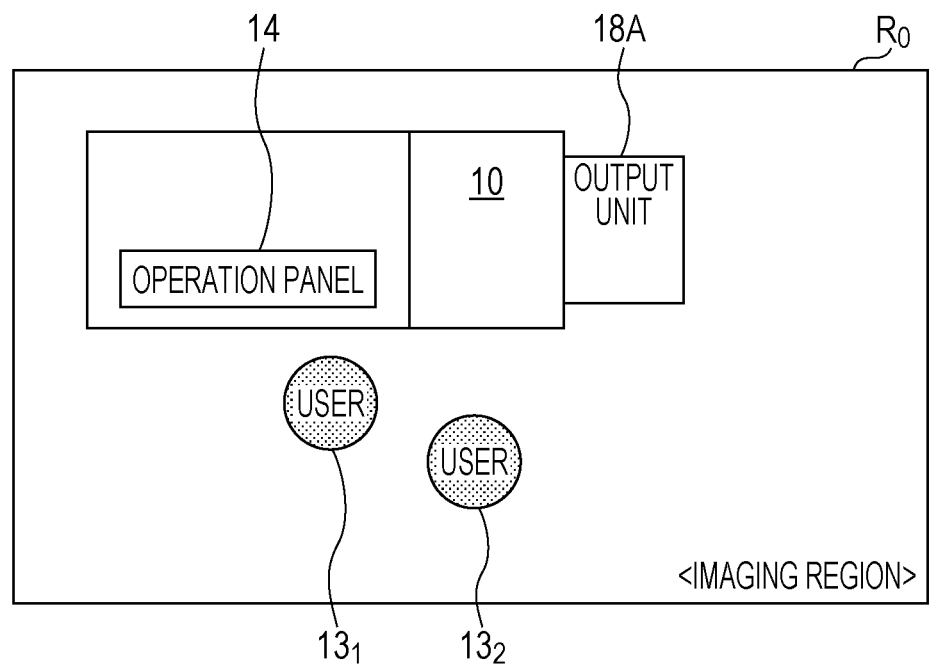

For example, it is detected whether a person is present within an imaging region $R_0$ (the entire imaging region) and how many persons are present. In the example of FIG. 13A, no persons are present within the imaging region $R_0$. In the examples of FIG. 13B and FIG. 13C, one person 13 is present within the imaging region $R_0$. In the example of FIG. 13D, two persons, a person $13_1$ and a person $13_2$, are present within the imaging region $R_0$.

Furthermore, for example, the person detection unit 40 detects whether a person is present within a region $R_A$ near the operation panel 14 and how many persons are present, and detects whether a person is present within a region $R_B$ near the output unit 18A and how many persons are present. In the example of FIG. 13B, there is one person 13 present within the region $R_A$ but no persons are present within the region $R_B$. In the example of FIG. 13C, there is one person 13 present within the region $R_B$ but no persons are present within the region $R_A$.

<Interruption Cancellation Processing>

Next, the interruption cancellation processing will be described.

Figure 9:
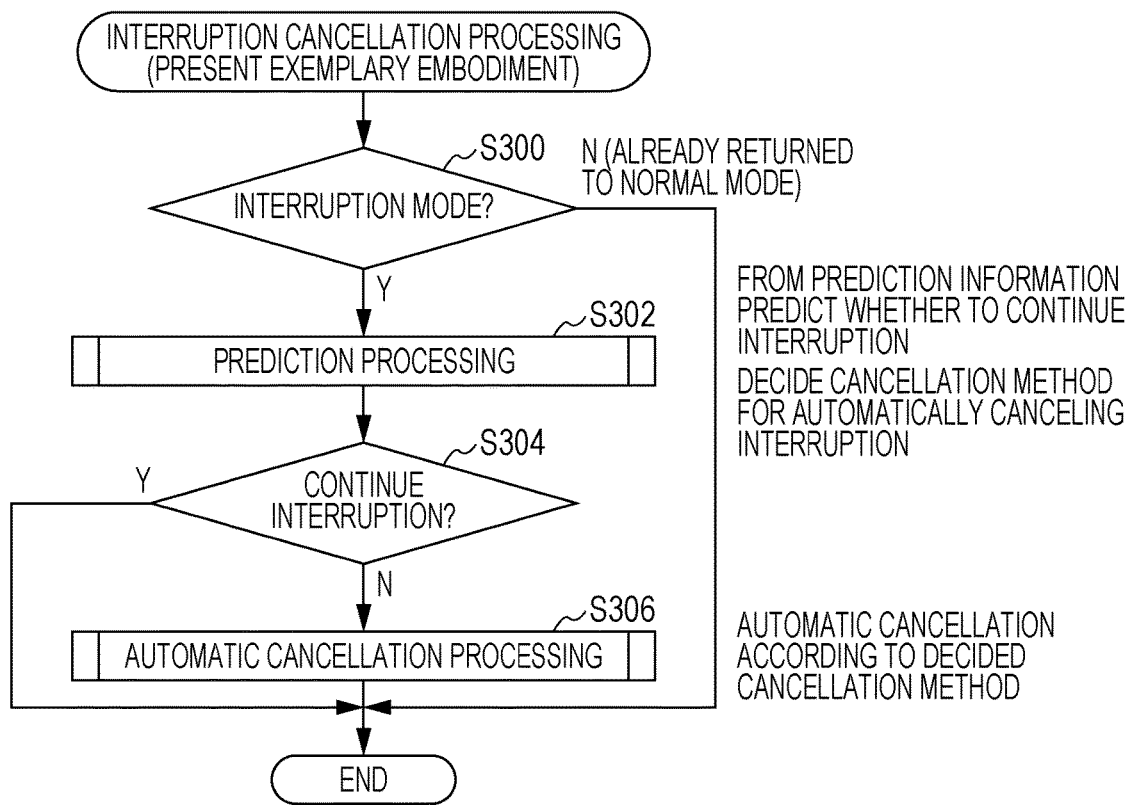
FIG. 9 is a flowchart depicting an example of the flow of "interruption cancellation processing" according to an exemplary embodiment of the present disclosure.

FIG. 9 is a flowchart depicting an example of the flow of the "interruption cancellation processing" according to an exemplary embodiment of the present disclosure. A program for the interruption cancellation processing is read from the ROM 12B and executed by the CPU 12A of the information processing unit 12 (see FIG. 1).

The program for the interruption cancellation processing is started upon notification of the completion of an interruption job. Furthermore, the CPU starts measuring time at the same time as the interruption cancellation processing is started.

First, in S300, the CPU confirms whether or not the processing mode is the interruption mode. There are cases where, after the completion of an interruption job, the interruption is canceled by the interruption user and the processing mode returns to the normal mode. In the case where the interruption mode is in effect, processing proceeds to S302. In the case where the processing mode has returned to the normal mode, the routine is terminated.

Next, in S302, from various types of prediction information, the CPU predicts whether the interruption mode is to be continued or the interruption mode is to be canceled, and which cancellation method is to be used in the case where the interruption mode is to be canceled.

Figure 10:
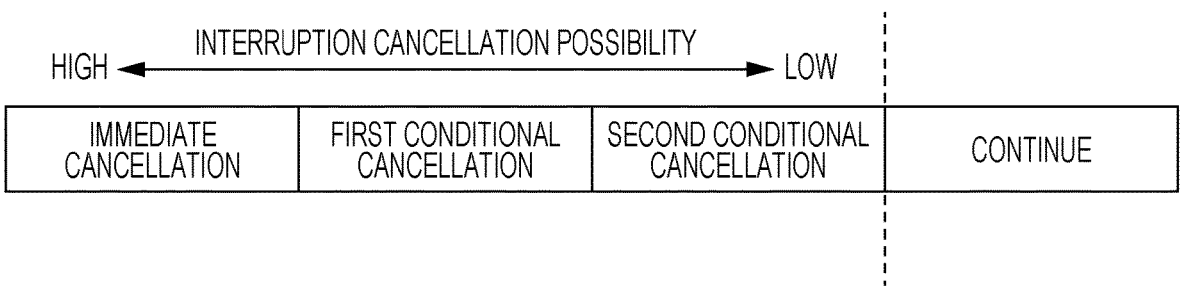
FIG. 10 is a schematic view depicting a prediction result.

FIG. 10 is a schematic view depicting a prediction result. Prediction results are first divided into the case where the interruption mode is to be continued and the case where the interruption mode is to be canceled. In the present exemplary embodiment, there are three cancellation methods which are "immediate cancellation", "first conditional cancellation", and "second conditional cancellation". The possibility of the interruption mode being canceled increases in the order of immediate cancellation>first conditional cancellation>second conditional cancellation. Each cancellation method will be briefly described. It should be noted that the detailed procedure for each cancellation method will be described later (see FIG. 14).

In the "immediate cancellation", after the completion of an interruption job, the CPU immediately cancels the interruption mode and causes a transition to the normal mode, and restarts the suspended job.

In "first conditional cancellation", the CPU starts preparation to restart a suspended job, assuming that in principle the interruption mode is to be canceled. After the completion of the interruption job, once a predetermined time has elapsed, the CPU cancels the interruption mode and causes a transition to the normal mode, and restarts the suspended job. The CPU, if having received an instruction to continue the interruption within the predetermined time, continues the interruption mode as an exception.

In the "second conditional cancellation", the CPU starts preparation to restart a suspended job, assuming that in principle the interruption mode is to be continued. If an additional trigger is not generated within the predetermined time, the CPU continues the interruption mode. If an additional trigger is generated within the predetermined time, the CPU as an exception cancels the interruption mode and causes a transition to the normal mode, and restarts the suspended job.

In any of the immediate cancellation, first conditional cancellation, and second conditional cancellation, the interruption mode is automatically canceled if a state is entered in which the interruption mode may be canceled without the interruption user having to issue an explicit instruction by pressing the interruption button, for example.

In the "immediate cancellation", immediately after the completion of an interruption job, the interruption mode is canceled, assuming that a state has been entered in which the interruption may be canceled. In the "first conditional cancellation", in a case where there is no instruction to continue the interruption mode and the predetermined time has elapsed, the interruption mode is canceled, assuming that a state has been entered in which the interruption mode may be canceled. In the "second conditional cancellation", in a case where an additional trigger is generated within the predetermined time, the interruption mode is canceled, assuming that a state has been entered in which the interruption mode may be canceled.

Next, in S304, the CPU determines whether or not the interruption mode is to be continued, on the basis of the prediction result obtained in S302. In the case where the interruption mode is not to be continued, processing proceeds to S306. In the case where the interruption mode is to be continued, there is no need for anything to be carried out, and therefore the routine is terminated.

Next, in S306, the CPU executes "automatic cancellation processing" and terminates the routine. In the "automatic cancellation processing", the interruption mode is canceled using the cancellation method predicted in S302.

(Continuation Causes/Cancellation Causes, Etc.)

FIG. 12 is a chart depicting an example of prediction information serving as determination material in a first exemplary embodiment. The prediction information is constituted by internal state information which is information representing the device internal state, and external state information which is information representing the device external state.

The internal state information is stored in a storage device which is inside the information processing unit 12, such as the memory 12D of FIG. 1. A possible example of the internal state information is job management information such as the job management table.

The external state information is information detected by a detection unit which is outside the information processing unit 12. Possible examples of the external state information are the document detection information and the person detection information.

For each item of prediction information, examples are given constituting a "continuation cause" that suggests continuation of an interruption, a "cancellation cause" that suggests cancellation of an interruption, and "waiting user information" that suggests the presence of a waiting user.

Possible examples of a "continuation cause" are there being another job of the interruption user, there being another job recently registered by the interruption user, there being a document on the platen glass, there being a document on the automatic document feeder, there being documents on both the platen glass and the automatic document feeder, there being a person within the imaging region, there being a person near the operation panel, and the like.

Possible examples of a "cancellation cause" are there not being another job of the interruption user, another job of a general user being received after transition to the interruption mode, there not being documents on either the platen glass or the automatic document feeder, there not being a person within the imaging region, there not being a person near the operation panel, and the like.

Possible examples of "waiting user information" are there being a job waiting to be output, a new job being received, the operation rate being high, there being two or more persons within the imaging region, and the like.

(Prediction Processing)

Next, the "prediction processing" executed in step S302 in FIG. 9 will be described.

FIG. 11 is a flowchart depicting an example of the flow of the "prediction processing".

First, in step S400, the CPU acquires prediction information including internal state information and external state information.

Next, in step S402, the CPU predicts whether or not the interruption mode is to be continued.

In a case where there is no "continuation cause" within the acquired internal state information, the CPU predicts that the interruption mode is not to be continued, and processing proceeds to step S404. In a case where there is a "continuation cause" within the acquired internal state information, the CPU predicts that the interruption mode is to be continued, and processing proceeds to step S410.

Next, in step S404, the CPU predicts whether or not the interruption mode may be immediately canceled.

In a case where there is no "continuation cause" within the acquired internal state information and there is a "cancellation cause" within the acquired external state information, processing proceeds to step S406. In this case, it is predicted that the interruption mode is not to be continued, and, since there is no problem if the interruption mode is canceled, in step S406, the CPU predicts that the cancellation method is to be "immediate cancellation" and terminates the routine.

In a case where there is no "continuation cause" within the acquired internal state information and there is no "cancellation cause" within the acquired external state information, processing proceeds to step S408. In this case, it is predicted that the interruption mode is not to be continued; however, it is not possible to determine that canceling the interruption mode would be problem free, and therefore, in step S408, the CPU predicts that the cancellation method is to be the "first conditional cancellation" and terminates the routine.

Next, in step S410, the CPU predicts whether or not it is necessary to cancel the interruption mode.

In a case where there is a "continuation cause" within the acquired internal state information and there is no "waiting user information" within the acquired prediction information, processing proceeds to step S414. In this case, it is predicted that the interruption mode is to be continued, and, since the interruption mode should not be canceled, in step S414, the CPU predicts "continuation" and terminates the routine.

In a case where there is a "continuation cause" within the acquired internal state information and there is "waiting user information" within the acquired prediction information, processing proceeds to step S412. In this case, it is predicted that the interruption mode is to be continued, but, since it is necessary to cancel the interruption mode due to a waiting user who is waiting for cancellation of the interruption mode, in step S412, the CPU predicts that the cancellation method is to be the "second conditional cancellation" and terminates the routine.

Hereinafter, a specific example of the prediction processing will be described.

EXAMPLE 1

Example 1 is a case where "immediate cancellation" is predicted.

The interruption user causes a transition to the interruption mode by operating the interruption button during the execution of another job, and instructs the execution of a copy job as an interruption job. When the copy job is completed, the device CPU is notified of the completion. The CPU confirms the prediction information.

Here, the following prediction information is acquired.
There are no other jobs of the interruption user (internal state information/cancellation cause)
There are no documents on either the platen glass or the automatic document feeder (external state information/cancellation cause)
The interruption user is standing in the periphery of the output unit (external state information/cancellation cause)

The CPU performs a prediction on the basis of these items of acquired prediction information. The acquired items of prediction information all correspond to a cancellation cause, as indicated in parentheses. Since there are no continuation causes within the internal state information, the CPU predicts that the interruption mode is not to be continued. Since there is a cancellation cause within the external state information, the CPU predicts that the interruption mode is to be canceled according to the "immediate cancellation".

EXAMPLE 2

Example 2 is a case where "first conditional cancellation" is predicted.

The interruption user causes a transition to the interruption mode by operating the interruption button during the execution of another job, and instructs the execution of a copy job as an interruption job. When the copy job is completed, the device CPU is notified of the completion. The CPU confirms the prediction information.

Here, the following prediction information is acquired.
There are no other jobs of the interruption user (internal state information/cancellation cause)
There is a document on the platen glass (external state information/continuation cause)
The interruption user is standing in the periphery of the operation panel (external state information/continuation cause)

The CPU performs a prediction on the basis of these items of acquired prediction information. The acquired items of prediction information correspond to a cancellation cause or a continuation cause, as indicated in parentheses. Since there are no continuation causes within the internal state information, the CPU predicts that the interruption mode is not to be continued. Since there is a cancellation cause within the external state information, the CPU predicts that the interruption mode is to be canceled according to "first conditional cancellation".

EXAMPLE 3

Example 3 is a case where "continuation" is predicted.

The interruption user causes a transition to the interruption mode by operating the interruption button during the execution of another job, and instructs the execution of an accumulation printing job as an interruption job. When the accumulation printing job is completed, the device CPU is notified of the completion. The CPU confirms the prediction information.

Here, the following prediction information is acquired.
There is another job of the interruption user, registered at a time close to the completed interruption job (internal state information/continuation cause)
There are no documents on either the platen glass or the automatic document feeder (external state information/cancellation cause)
The interruption user is standing in the periphery of the output unit (external state information/cancellation cause)

The CPU performs a prediction on the basis of these items of acquired prediction information. The acquired items of prediction information correspond to a cancellation cause or a continuation cause, as indicated in parentheses. Since there is a continuation cause within the internal state information and there are no waiting users, the CPU predicts that the interruption mode is to be continued.

EXAMPLE 4

Example 4 is a case where "second conditional cancellation" is predicted.

The interruption user causes a transition to the interruption mode by operating the interruption button during the execution of another job, and instructs the execution of an accumulation printing job as an interruption job. When the accumulation printing job is completed, the device CPU is notified of the completion. The CPU confirms the prediction information.

Here, the following prediction information is acquired.
There is another job of the interruption user, registered at a time close to the job carried out (internal state information/continuation cause)
There are no documents on either the platen glass or the automatic document feeder (external state information/cancellation cause)
The interruption user is standing in the periphery of the output unit (external state information/cancellation cause)
A job of another user has been received after transitioning to the interruption mode (internal state information/waiting user information)

The CPU performs a prediction on the basis of these items of acquired prediction information. The acquired items of prediction information correspond to a cancellation cause, a continuation cause, or waiting user information, as indicated in parentheses. Since there is a continuation cause within the internal state information but there is a general user who is waiting for the cancellation of the interruption mode, the CPU predicts that the interruption mode is to be canceled according to the "second conditional cancellation".

(Interruption Cancellation Processing)

Figure 14:
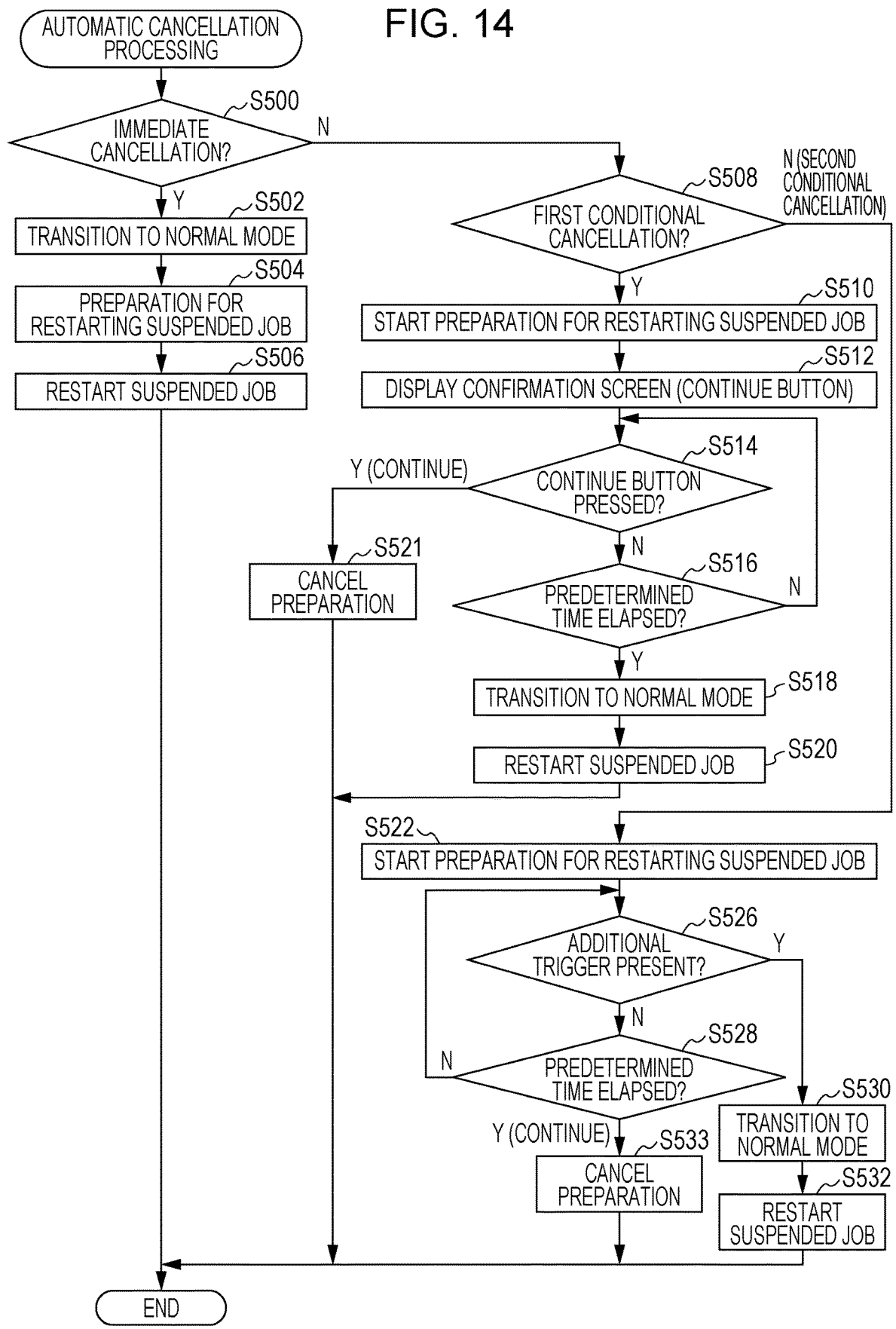
FIG. 14 is a flowchart depicting an example of the flow of conventional "automatic cancellation processing"

Next, the "automatic cancellation processing" executed in step S306 in FIG. 9 will be described. FIG. 14 is a flowchart depicting an example of the flow of conventional "automatic cancellation processing". As described above, in step S302 in FIG. 9, a prediction is carried out as to whether the cancellation method is to be the immediate cancellation, first conditional cancellation, or second conditional cancellation. In the present exemplary embodiment, the cancellation method is changed in a flexible manner in accordance with the device internal state and external state.

First, in step S500, the CPU determines whether or not the cancellation method is to be "immediate cancellation". In the case where the cancellation method is "immediate cancellation", the CPU proceeds to step S502. The CPU executes "immediate cancellation processing" in step S502 to step S506, and terminates the routine. In the case where the cancellation method is another cancellation method, the CPU proceeds to step S508.

In a case where the cancellation method does not correspond to "immediate cancellation" and processing proceeds to step S508, the CPU, in step S508, determines whether or not the cancellation method is "first conditional cancellation". In the case where the cancellation method is "first conditional cancellation", the CPU proceeds to step S510. The CPU executes "first conditional cancellation processing" in step S510 to step S521, and terminates the routine. In the case where the cancellation method is another cancellation method, the CPU proceeds to step S522.

In a case where the cancellation method does not correspond to either "immediate cancellation" or "first conditional cancellation" and processing proceeds to step S522, the cancellation method is "second conditional cancellation". The CPU executes "second conditional cancellation processing" in step S522 to step S533, and terminates the routine.

Hereinafter, each cancellation method will be described.

—Immediate Cancellation Processing—

Next, in step S502, the CPU immediately cancels the interruption mode and causes the processing mode to transition to the normal mode. Next, in step S504, the CPU starts preparation to restart the suspended job. Next, in step S506, the CPU instructs the restart of the suspended job, and terminates the routine.

—First Conditional Cancellation Processing—

Next, in step S510, the CPU starts preparation to restart the suspended job. Next, in step S512, the CPU displays a confirmation screen that confirms the intention to continue the interruption mode. The confirmation screen includes a continue button that instructs the continuation of the interruption mode.

FIG. 15 is a schematic view depicting an example of the confirmation screen. After completion of the interruption job, a home screen 200 that is a standby screen is displayed on the operation panel. In the depicted example, a confirmation screen 300 is displayed superposing the home screen 200. A mark 202 indicating that an interruption is in process is displayed on the home screen 200.

The confirmation screen 300 includes a message 302, a return button 304 that issues an instruction to return to the home screen, and a continue button 306 that instructs continuation. In the case of the "first conditional cancellation", a message conveying that the interruption mode is to be canceled or a message confirming the intention to continue the interruption mode is displayed as the message 302, such as "The interruption will be canceled in 5 seconds. Do you wish to continue the interruption?".

Next, in step S514, the CPU determines whether or not the continue button has been pressed. In the case where the continue button has been pressed, the interruption mode is not to be canceled, and therefore the CPU stops preparation to restart the suspended job in step S521, and then terminates the routine. In the case where the continue button has not been pressed, processing proceeds to step S516.

Next, in step S516, after the completion of the interruption job, the CPU determines whether or not the predetermined time has elapsed. In the case where the predetermined time has not elapsed, processing returns to step S514. In the case where the predetermined time has elapsed without the continue button being pressed, processing proceeds to step S518.

Here, the predetermined time is assumed to be a "first waiting time". The first waiting time is set in the range of 10 seconds to 5 minutes so as to reduce the waiting time for a general user. The first waiting time may be 1 minute, for example. In the example depicted in FIG. 15, the message 302 which conveys the remaining time (5 seconds) of the first waiting time is displayed on the confirmation screen 300; however, the time that has elapsed from when the interruption job was notified may be displayed.

Next, in step S518, the CPU cancels the interruption mode and causes the processing mode to transition to the normal mode. Next, in step S520, the CPU instructs the restart of the suspended job, and terminates the routine.

Even if the interruption user forgets to cancel the interruption mode, the interruption mode is automatically canceled after the predetermined time has elapsed. Furthermore, preparation has been carried out to restart the suspended job, at the point in time of having transitioned to the normal mode. After the transition to the normal mode has been carried out, the restart of the suspended job is promptly instructed.

—Second Conditional Cancellation Processing—

Next, in step S522, the CPU starts preparation to restart the suspended job. Next, in step S526, the CPU determines acquires new prediction information and determines whether or not an additional trigger has been generated. In the case where an additional trigger has been generated, processing proceeds to step S528. In the case where an additional trigger has not been generated, processing proceeds to step S530.

Possible examples of an additional trigger are the switching of the user such as logging-in or logging-out, a subsequent change in the device state, and the like. A possible example of a subsequent change in the device internal state is the receiving of a new job, or the like. A possible example of a subsequent change in the device external state is a person who was present near the output unit no longer being present, or the like.

Next, in step S528, after the completion of the interruption job, the CPU determines whether or not the predetermined time has elapsed. In the case where the predetermined time has not elapsed, processing returns to step S526. In the case where the predetermined time has elapsed without an additional trigger being generated, the interruption mode is not to be canceled, and therefore the CPU stops preparation to restart the suspended job in step S533, and then terminates the routine.

Here, the predetermined time is assumed to be a "second waiting time". Similar to the first waiting time, the second waiting time is set in the range of 10 seconds to 5 minutes so as to reduce the waiting time for a general user. The second waiting time may be 1 minute, for example.

In a case where an additional trigger has been generated and processing proceeds to step S530, in step S530, the CPU cancels the interruption mode and causes the processing mode to transition to the normal mode. Next, in step S532, the CPU instructs the restart of the suspended job, and terminates the routine. Similar to the first conditional cancellation, preparation has been made to restart the suspended job, and after the transition to the normal mode has been carried out, the restart of the suspended job is promptly instructed.

<Second Exemplary Embodiment>

In a second exemplary embodiment, "operation history information" is included in prediction information serving as determination material.

FIG. 16 is a chart depicting an example of prediction information serving as determination material in the second exemplary embodiment. The "operation history information" is history relating to interruption cancellation operations, history relating to accumulation printing output operations, or the like. The next movement of the user is predicted from the usual operations of the user and used as determination material.

A possible example of a continuation cause is a tendency for jobs to be accumulated and collectively output all at once on the day in question (accumulation printing/batch output), or the like. If the interruption user has a tendency to use accumulation printing and perform batch outputs, it is predicted that the interruption is to be continued and another job is to be executed in continuation.

Possible examples of a cancellation cause are a tendency for jobs to be output immediately once accumulated (direct printing), a tendency for a long time to elapse without an operation being performed during an interruption (cancellation forgotten), and the like. If the interruption user has a tendency to output each time without using accumulation printing, it is predicted that the interruption is to be continued and another job is not to be executed in continuation. Furthermore, if the interruption user has a tendency to forget cancellation, it is predicted that another job is not to be executed in continuation merely due to the interruption cancellation being forgotten.

In the second exemplary embodiment, the determination criteria in step S402 of the "prediction processing" in FIG. 11 is different from that in the first exemplary embodiment.

In the first exemplary embodiment, in step S402, the CPU predicts whether or not the interruption is to be continued, according to whether or not there is a "continuation cause" within the acquired internal state information. Furthermore, in step S404, the CPU predicts whether the interruption may be canceled, according to whether or not there is a "cancellation cause" within the acquired external state information.

In contrast, in the second exemplary embodiment, in step S402, the CPU predicts whether or not the interruption is to be continued, according to whether or not there is a "continuation cause" within the acquired internal state information, and whether or not there is a "cancellation cause" within the acquired operation history information.

It should be noted that, in step S404, there is a similarity with the first exemplary embodiment in that the CPU predicts whether the interruption may be canceled, according to whether or not there is a "cancellation cause" within the acquired external state information.

In a case where there is no "continuation cause" within the acquired internal state information, it is predicted that the interruption is not to be continued, and processing proceeds to step S404. In a case where there is a "continuation cause" within the acquired internal state information, it is confirmed whether or not there is a "cancellation cause" within the operation history information.

Even if there is a "continuation cause" within the internal state information, in a case where there is a "cancellation cause" within the operation history information, it is predicted that the interruption is not to be continued, and processing proceeds to step S404. However, in a case where there is a "continuation cause" within the internal state information and there is no "cancellation cause" within the operation history information, it is predicted that the interruption is to be continued, and processing proceeds to step S410.

Hereinafter, a specific example of the prediction processing will be described.

EXAMPLE 5

Example 5 is a case where "first conditional cancellation" is predicted.

The interruption user causes a transition to the interruption mode by operating the interruption button during the execution of another job, and instructs the execution of an accumulation printing job as an interruption job. When the accumulation printing job is completed, the device CPU is notified of the completion. The CPU confirms the prediction information.

Here, the following prediction information is acquired.

There is another job of the interruption user registered several hours before (internal state information/continuation cause)

There are no documents on either the platen glass or the automatic document feeder (external state information/cancellation cause)

The interruption user is standing in the periphery of the output unit (external state information/cancellation cause)

Jobs are output immediately once accumulated (operation history information/cancellation cause)

There are a large number of cases where a long time elapses without an operation being performed during an interruption (operation history information/cancellation cause)

The CPU performs a prediction on the basis of these items of acquired prediction information. The acquired items of prediction information correspond to a cancellation cause or a continuation cause, as indicated in parentheses. Although there is a continuation cause within the internal state information, there is a cancellation cause within the operation history information, such as cancellation often being forgotten, and therefore the CPU predicts that the interruption is not to be continued. Since there is a cancellation cause within the external state information, the CPU predicts that the interruption mode is to be canceled according to the "first conditional cancellation".

<Third Exemplary Embodiment>

In a third exemplary embodiment, "operation history information" is included in the prediction information, similar to the second exemplary embodiment. In the third exemplary embodiment, the determination criteria in step S410 of the "prediction processing" in FIG. 11 is different from that in the first exemplary embodiment.

In the first exemplary embodiment, in step S402, the CPU predicts whether or not the interruption is to be continued, according to whether or not there is a "continuation cause" within the acquired internal state information. Furthermore, in step S410, the CPU predicts whether or not it is necessary to cancel the interruption, according to whether or not there is "waiting user information" within the acquired prediction information.

In contrast, in the third exemplary embodiment, in step S410, the CPU predicts whether or not it is necessary to cancel the interruption, according to whether or not there is a "cancellation cause" within the acquired operation history information.

As exemplified in FIG. 16, the case where is a tendency for jobs to be accumulated and collectively output all at once on the day in question (accumulation printing/batch output) corresponds to a "continuation cause" as it is assumed that interruption jobs are also to be batch output. However, the case where there is a tendency for jobs to be immediately output once accumulated (direct printing) corresponds to a "cancellation cause" as it is assumed that interruption jobs are also to be sequentially output.

It should be noted that, in step S402, there is a similarity with the first exemplary embodiment in that the CPU predicts whether or not the interruption is to be continued, according to whether or not there is a "continuation cause" within the acquired internal state information.

In a case where there is a "continuation cause" within the acquired internal state information and there is no "cancellation cause" within the acquired operation history information, processing proceeds to step S414. In this case, since it is not necessary to cancel the interruption, in step S414, the CPU predicts "continuation" and terminates the routine.

In a case where there is a "continuation cause" within the acquired internal state information and there is a "cancellation cause" within the acquired operation history information, processing proceeds to step S412. In this case, since it is necessary to cancel the interruption, in step S412, the CPU predicts that the cancellation method is to be the "second conditional cancellation" and terminates the routine.

Hereinafter, a specific example of the prediction processing will be described.

EXAMPLE 6

Example 6 is a case where "second conditional cancellation" is predicted.

The interruption user causes a transition to the interruption mode by operating the interruption button during the execution of another job, and instructs the execution of an accumulation printing job as an interruption job. When the accumulation printing job is completed, the device CPU is notified of the completion. The CPU confirms the prediction information.

Here, the following prediction information is acquired.

There is another job of the interruption user registered several hours before (internal state information/continuation cause)

There are no documents on either the platen glass or the automatic document feeder (external state information/cancellation cause)

The interruption user is standing in the periphery of the output unit (external state information/cancellation cause)

Jobs are output immediately once accumulated (operation history information/cancellation cause)

The CPU performs a prediction on the basis of these items of acquired prediction information. The acquired items of prediction information correspond to a cancellation cause or a continuation cause, as indicated in parentheses. With there being a continuation cause within the internal state information, the CPU predicts that the interruption is to be continued, but predicts that the interruption mode is to be canceled according to the "second conditional cancellation" since there is a cancellation cause within the operation history information, such as the accumulation printing function not being used.

In the third exemplary embodiment, in the case where there is a "cancellation cause" within the acquired operation history information, the CPU predicts that it is necessary to cancel the interruption (second conditional cancellation); however, in the case where there is a "continuation cause" within the acquired operation history information, the CPU may predict that it is not necessary to cancel the interruption (continuation).

<Fourth Exemplary Embodiment>

In a fourth exemplary embodiment, "information indicating the device internal state from before an interruption (pre-interruption internal state information)" is included in prediction information serving as determination material. FIG. 17 is a chart depicting an example of the prediction information serving as determination material in the fourth exemplary embodiment. Possible examples of waiting user information are the case where an interruption occurs during output, the case where an interruption occurs during log-in, and the like.

In step S410 in FIG. 11, there is a similarity with the first exemplary embodiment in that the CPU predicts whether or not it is necessary to cancel the interruption, according to whether or not there is "waiting user information" within the acquired prediction information. The fourth exemplary embodiment is different from the first exemplary embodiment in that waiting user information is acquired from pre-interruption internal state information.

As exemplified in FIG. 17, in a case where a transition has been made to the interruption mode during the execution of a copy job, it is predicted that there is a general user who is waiting for the interruption cancellation.

Hereinafter, a specific example of the prediction processing will be described.

EXAMPLE 7

Example 7 is a case where "second conditional cancellation" is predicted.

The interruption user causes a transition to the interruption mode by operating the interruption button during the execution of a copy job, and instructs the execution of an accumulation printing job as an interruption job. When the accumulation printing job is completed, the device CPU is notified of the completion. The CPU confirms the prediction information.

Here, the following prediction information is acquired.

There is another job of the interruption user (internal state information/continuation cause)

There are no documents on either the platen glass or the automatic document feeder (external state information/cancellation cause)

The interruption user is standing in the periphery of the output unit (external state information/cancellation cause)

A transition to the interruption mode during the execution of a copy job (pre-interruption internal state information/waiting user information)

The CPU performs a prediction on the basis of these items of acquired prediction information. The acquired items of prediction information correspond to a cancellation cause, a continuation cause, or waiting user information, as indicated in parentheses. With there being a continuation cause within the internal state information, the CPU predicts that the interruption is to be continued, but predicts that the interruption mode is to be canceled according to the "second conditional cancellation" since there is waiting user information within the pre-interruption internal state information, such as having transitioned to the interruption mode during the execution of a copy job.

<Fifth Exemplary Embodiment>

In the "first conditional cancellation" of the aforementioned first exemplary embodiment, the interruption is canceled in a case where the predetermined time has elapsed without an instruction to continue the interruption being received. In a fifth exemplary embodiment, in the "first conditional cancellation", the interruption is canceled also in a case where an additional trigger has occurred within the predetermined time, similar to the "second conditional cancellation".

Figure 18:
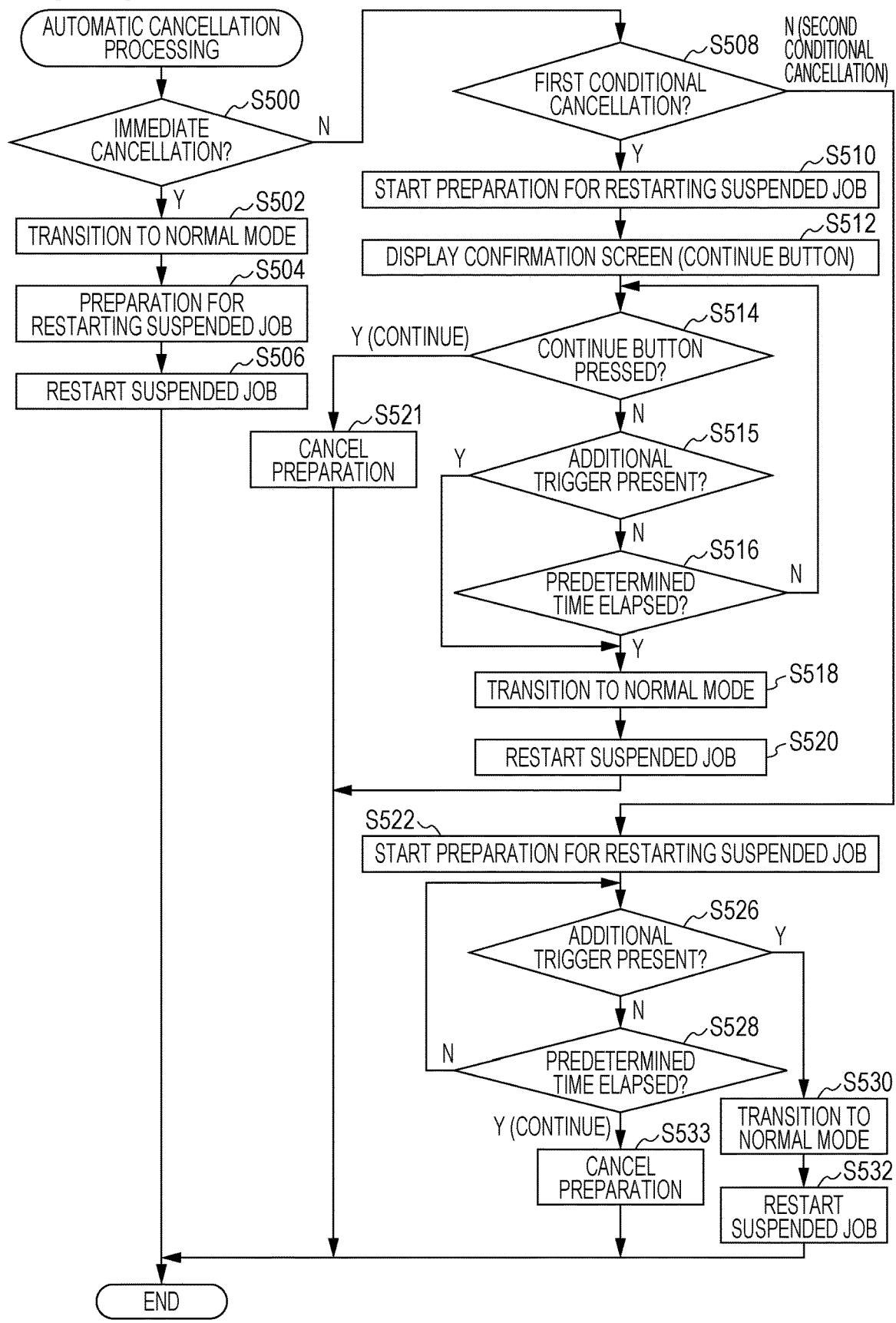
FIG. 18 is a flowchart depicting another example of the flow of "automatic cancellation processing" of a fifth exemplary embodiment.

FIG. 18 is a flowchart depicting another example of the flow of "automatic cancellation processing" according to the fifth exemplary embodiment. Apart from step S515 being inserted between step S514 and step S516 in FIG. 14, the configuration is the same as the flowchart depicted in FIG. 14, and therefore the same portions are denoted by the same reference numbers and descriptions thereof are omitted.

In step S515, the CPU determines whether or not an additional trigger has been generated. For example, the CPU acquires new prediction information and determines whether or not at least one of the device internal state and external state has subsequently changed.

In the case where an additional trigger has been generated, processing proceeds to step S518 without waiting for the predetermined time to elapse. In the case where an additional trigger has not been generated, processing proceeds to step S516.

Next, in step S516, after the completion of the interruption job, the CPU determines whether or not the predetermined time has elapsed. In the case where the predetermined time has not elapsed, processing returns to step S514. In the case where the continue button is not pressed within the predetermined time and an additional trigger is generated, and the case where the continue button is not pressed within the predetermined time and the predetermined time has elapsed without an additional trigger being generated, processing proceeds to step S518.

In the fifth exemplary embodiment, the case where the interruption mode is canceled corresponds to two cases where (1) the predetermined time has elapsed with there being no instruction to continue the interruption mode and an additional trigger has not been generated, and (2) there is no instruction to continue the interruption mode and an additional trigger has been generated, within the predetermined time.

In the case of (1), after the predetermined time has elapsed, the interruption mode is canceled, assuming that a state has been entered in which the interruption mode may be canceled. Furthermore, in the case of (2), when an additional trigger is generated, the interruption mode is canceled, assuming that a state has been entered in which the interruption mode may be canceled.

MODIFIED EXAMPLE

It should be noted that the configurations of the information processing device and the non-transitory computer readable medium described in the aforementioned exemplary embodiments are exemplary, and it goes without saying that the configurations may be altered without deviating from the gist of the present disclosure.

In the aforementioned exemplary embodiments, a description has been given regarding a case where interruption cancellation processing is realized using software; however, similar processing may be realized using hardware.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The exemplary embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising a processor configured to issue an instruction to an image forming device, the processor being configured to:

when an interruption instruction is received, issue an instruction for the image forming device to transition from a normal mode in which jobs are executed in an order that the jobs are received, to an interruption mode in which a job that is being executed is suspended and an interruption job is executed first; and after completion of the interruption job, issue an instruction for the image forming device to transition from the interruption mode to the normal mode, in accordance with a cancellation method in which the interruption mode is canceled, wherein in the cancellation method:

when an instruction to continue the interruption mode is not received within a predetermined waiting time from completion of the interruption job, and an additional trigger that is a cause for canceling the interruption mode is not generated, the interruption mode is canceled after the waiting time has elapsed, or when an instruction to continue the interruption mode is not received within the waiting time from completion of the interruption job, and an additional trigger that is a cause for canceling the interruption mode is generated, the interruption mode is canceled when the additional trigger is generated.

2. The information processing device according to claim 1,
  wherein the processor is configured to predict the cancellation method when there is no cause for continuing the interruption and there is no cause for immediately canceling the interruption.

3. The information processing device according to claim 1,
  wherein the processor is configured to start preparation to restart the suspended job, before issuing an instruction to transition to the normal mode, after completion of the interruption job.

4. The information processing device according to claim 2,
  wherein the processor is configured to start preparation to restart the suspended job, before issuing an instruction to transition to the normal mode, after completion of the interruption job.

5. The information processing device according to claim 1,
  wherein the processor is configured to predict the cancellation method based on information regarding whether or not a job other than the interruption job of a user who issued the interruption instruction has been received.

6. The information processing device according to claim 1,
  wherein the processor is configured to predict the cancellation method based on information regarding whether or not a job of a user other than a user who issued the interruption instruction has been received.

7. The information processing device according to claim 1,
  wherein the processor is configured to predict the cancellation method based on information regarding whether or not a document has been detected, acquired from an external detector.

8. The information processing device according to claim 1,
  wherein the processor is configured to predict the cancellation method based on information regarding a detection result for a person who is present in a specific region in the periphery of the image forming device, acquired from an external detector.

9. The information processing device according to claim 1, wherein the processor is configured to predict the cancellation method based on information regarding an operation history of a user who issued the interruption instruction.

10. A non-transitory computer readable medium storing a program causing a computer to execute a process for issuing an instruction to an image forming device, the process comprising:
  when an interruption instruction is received, issuing an instruction for the image forming device to transition from a normal mode in which jobs are executed in an order that the jobs are received, to an interruption mode in which a job that is being executed is suspended and an interruption job is executed first; and
  after completion of the interruption job, issuing an instruction for the image forming device to transition from the interruption mode to the normal mode, according to a cancellation method of the interruption mode, wherein in the cancellation method:
  when an instruction to continue the interruption mode is not received within a predetermined waiting time from completion of the interruption job, and an additional trigger that is a cause for canceling the interruption mode is not generated, the interruption mode is canceled after the waiting time has elapsed, or
  when an instruction to continue the interruption mode is not received within the waiting time from completion of the interruption job, and an additional trigger that is a cause for canceling the interruption mode is generated, the interruption mode is canceled when the additional trigger is generated.

* * * * *